UNITED STATES PATENT OFFICE.

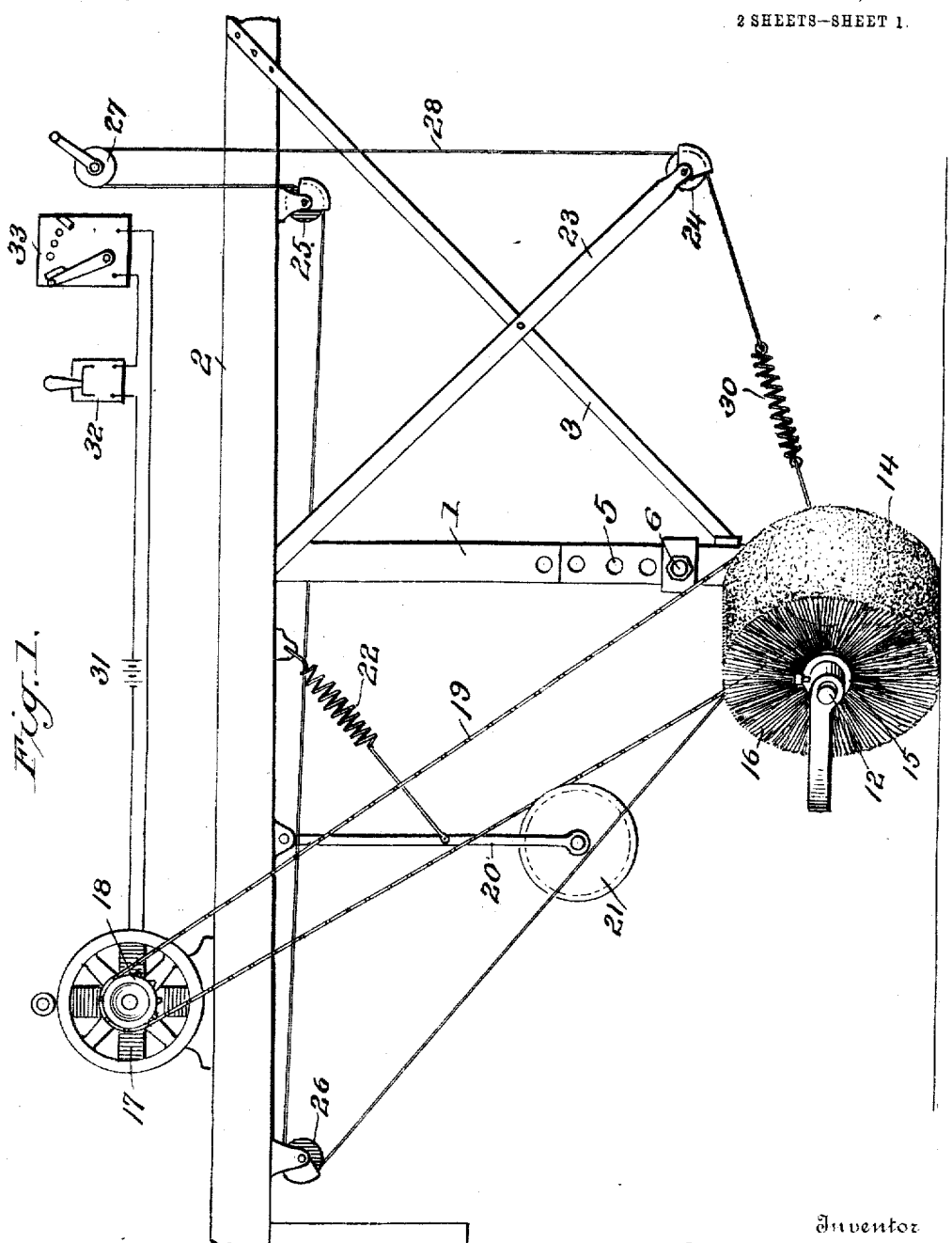

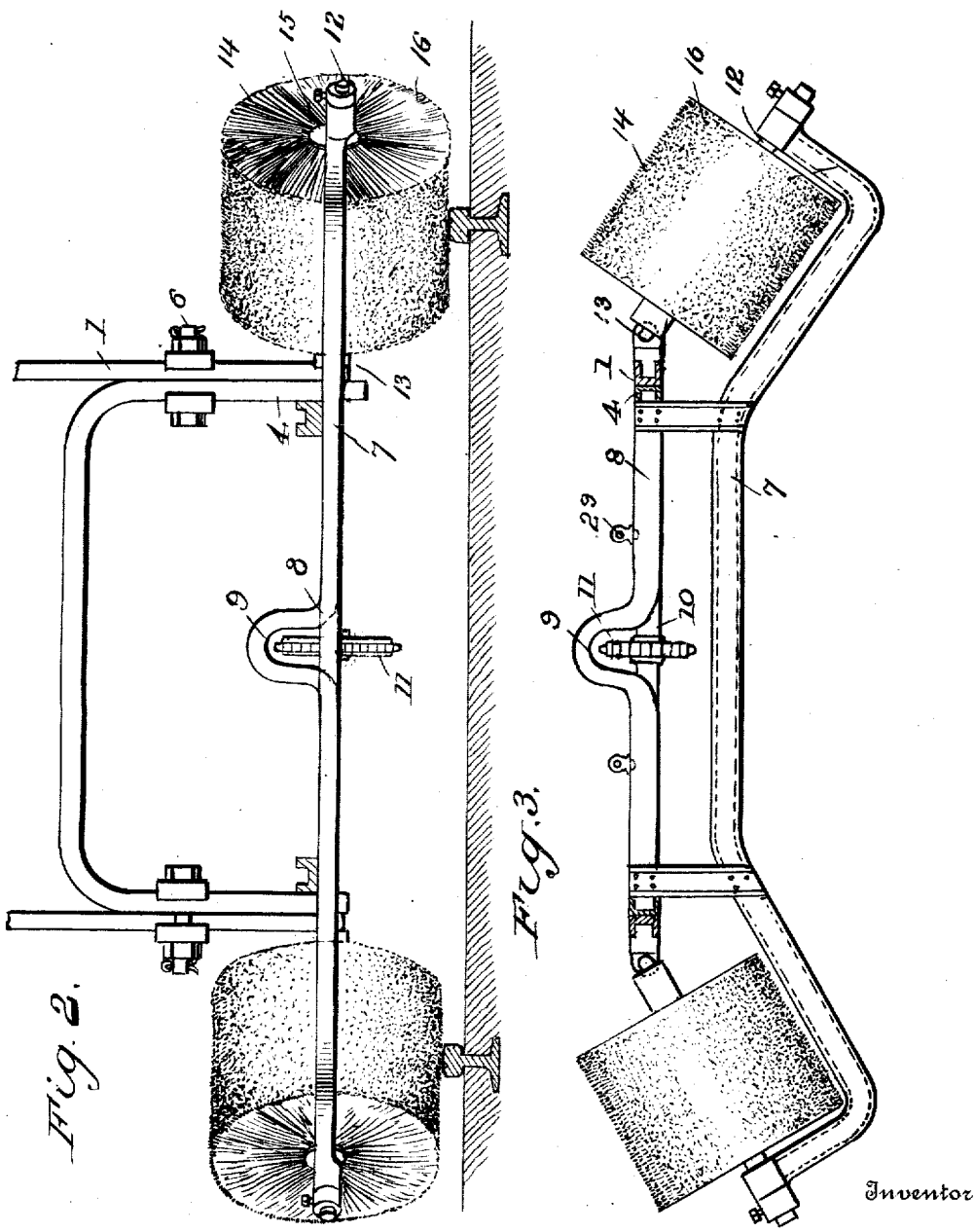

ALBERT M. GARDNER, OF INDIANAPOLIS, INDIANA.

ELECTRIC TRACK-SWEEPER.

1,017,208.  Specification of Letters Patent.  Patented Feb. 13, 1912.

Application filed June 23, 1911. Serial No. 634,988.

*To all whom it may concern:*

Be it known that I, ALBERT M. GARDNER, citizen of the United States, residing at Indianapolis, in the county of Marion and State of Indiana, have invented certain new and useful Improvements in Electric Track-Sweepers, of which the following is a specification.

This invention has relation to electrically operated track sweepers, and has for its object to provide such a sweeper which may be easily and readily applied to the sill of a car and which is operated by an electric motor for the purpose of keeping the track rails clear in advance of the wheels of the car.

With this object in view the structure includes brackets adapted to be applied to the car sill and which adjustably support a yoke. A frame is carried by the yoke and a shaft having end sections connected thereto is journaled in the frame. The electric motor is operatively connected with the said shaft and the end sections of the shaft carry brooms the axes of which are pitched at angles to the axis of the intermediate portion of the shaft. A hand operable means is provided and is connected with the said frame, whereby the yoke may be swung upon its pivotal connection with the brackets and the brooms may be raised and lowered with relation to the track rails.

In the accompanying drawings: Figure 1 is a side elevation of the sweeper; Fig. 2 is a rear elevation of the same; Fig. 3 is a top plan view of the same, with parts in section.

Corresponding and like parts are referred to in the following description and indicated in all the views of the accompanying drawings by the same reference characters.

The sweeping apparatus includes brackets 1 which are attached to the sill of a car 2 and which are supported at their lower end portions by means of braces 3. A yoke 4 is pivoted at its sides between the lower ends of the brackets 1 and the said brackets are provided each with a series of perforations 5 which are adapted to receive the pivot pins 6 which support the said yoke 4. A frame 7 is carried by the end portions of the yoke 4 and includes a forward cross bar 8 which lies over a shaft to be explained. The cross bar 8 is provided at a point intermediate its ends with a bowed section 9 which extends upwardly and forwardly and is adapted to act as a fender for a sprocket wheel to be explained.

A shaft 10 is journaled at its end portions in the ends of the yoke 4 and as before stated lies under the cross bar 8 of the frame. This shaft is provided at a point intermediate its ends with a fixed sprocket wheel 11 which lies within the bowed section 9 of the said cross bar. Shaft sections 12 are operatively connected with the ends of the shaft 10 by means of universal joints 13 and the sections 12 are disposed at acute angles to the shaft 10. The outer ends of the shaft sections 12 are journaled in the ends of the frame 7. Brooms 14 are carried by the shaft sections 12 and each said broom consists of a wooden core 15 in which are inserted the inner ends of bristles 16 which are preferably of bamboo. A motor 17 is mounted upon the sill 2 of the car and is provided upon its shaft with a sprocket wheel 18. A sprocket chain 19 passes around the sprocket wheels 18 and 11 and is adapted to transmit rotary movement from the shaft of the motor 17 to the shaft 10. Through the universal joints 13 rotary movement is transmitted from the shaft 10 to the shaft sections 12. Thus the brooms are revolved. When in operation the brooms are above and in contact with the track rails and their axes are at acute angles to the long dimensions of the said rails. A hanger 20 is pivotally connected at its upper end to the sill 2 of the car and is provided at its lower end with a journaled pulley 21 which in turn is provided with a grooved periphery which receives and supports the lower run of the sprocket chain 19. A coil spring 22 is attached at one end to the hanger 20 at a point intermediate the ends thereof and is under tension with a tendency to hold the periphery of the pulley 21 against the lower run of the chain 19.

An arm 23 extends forwardly and downwardly from the sill 2 and is provided at its lower end with a journaled pulley 24. Pulleys 25 and 26 are journaled at the under side of the sill 2, the pulley 25 being in advance of the brackets 1 and the pulley 26 being behind the said brackets. A windlass 27 is journaled at the platform or vestibule of the car and means of any desired form may be provided for holding the said windlass against rotation. A cable 28 is trained around the windlass 27, thence passes under the pulley 25, thence over the pulley 26 and is connected at one end with an eye 29 carried by the cross bar 8 of the frame 7. From the windlass 27 cables 28 extend down under the pulley 24 and are provided with coil spring sections 30 which in turn are connected with the said eye 29. Therefore it will be seen that by turning the windlass 27 the cables 28 may be moved longitudinally, whereby the yoke 4 will be swung upon its pivot pins 6 so that the frame 7 and its attachments will be elevated or lowered with relation to the track rails. When the said frame is in lowered position the brooms 14 will be resiliently held against the track rails by the spring sections 30 provided in the cables 28.

The electric circuit which operates the motor includes a source of power, indicated at 31, which is electrically connected with the said motor with a switch device 32. The said switch device 32 is electrically connected with a rheostat 33 which in turn is electrically connected with the said motor 17. Therefore it will be seen that by closing the switch 32 and manipulating the rheostat 33 the motor 17 may be rotated at any desired rate of speed, and as hereinbefore stated this rotary movement is transmitted to the shaft, shaft sections and brooms. Therefore as the car proceeds along the track rails the brooms rotating in advance of the forward wheels thereof will clear the treads of the said rails of obstructions and the supporting wheels of the car may have ample traction with the rails. The material removed from the rails is cast by the brooms beyond the outer sides of the rail and therefore this material needs to be operated upon but once only by the brooms to clear the rails. This is due to the peculiar disposition of the brooms with relation to the rails.

The sweeper is in the form of an attachment and may be easily and quickly applied or removed from the sill of a car, and with this attachment applied each car so equipped may serve as a means for keeping the track rails free of accumulated obstruction, such for instance as leaves, snow etc.

The parts of the apparatus are so arranged that the brooms when in operation rotate in a direction opposite to that in which the car wheels rotate. Consequently the material is lifted from the rails and cast beyond the sides of the same.

Having thus described the invention, what is claimed as new is:

1. A sweeper adapted to be applied to the sill of a vehicle comprising brackets, a yoke pivotally mounted in the brackets, a frame carried by the yoke, a shaft journaled in the yoke, shaft sections journaled in the frame and connected with the shaft by universal joints, brooms carried by the shaft sections, means for rotating the shaft, and means for resiliently holding the brooms in sweeping position.

2. A sweeper adapted to be applied to the sill of a vehicle comprising brackets, a yoke pivoted in the brackets, a frame attached to the yoke and including a cross bar having an intermediate bowed section, a shaft journaled in the yoke and extending under the cross bar, a sprocket wheel attached to the shaft and located within the bowed section of the cross bar, shaft sections journaled in the frame and operatively connected with the shaft by universal joints, brooms carried by the shaft sections, a motor mounted upon the sill of the vehicle and having its shaft operatively connected with the sprocket wheel upon the first mentioned shaft, and means for resiliently holding the brooms in sweeping position.

3. A sweeper adapted to be applied to the sill of a vehicle comprising brackets, a yoke pivoted in the brackets, a frame carried by the yoke, a shaft journaled in the yoke, shaft sections journaled in the frame and extending at angles to the axis of the said shaft and operatively connected with the shaft by universal joints, brooms carried by the shaft sections, means for rotating the shaft, and means for resiliently holding the brooms in sweeping position.

4. A sweeper adapted to be applied to the sill of a vehicle comprising brackets, a yoke pivoted therein, rotating brooms carried by the yoke, means for rotating the brooms, means for resiliently holding the brooms in sweeping position consisting of a windlass, pulleys journaled to the sill of the vehicle and in advance of the brooms, and a cable trained over the windlass and about the pulleys and connected at its opposite ends with the yoke and having in its length a resilient section.

In testimony whereof, I affix my signature in presence of two witnesses.

ALBERT M. GARDNER. [L. S.]

Witnesses:
L. O. COBLER,
RICHARD M. COLEMAN.